May 12, 1970 J. H. LEE ET AL 3,511,925

ELECTROLUMINESCENT COLOR IMAGE APPARATUS

Filed Jan. 13, 1966 3 Sheets-Sheet 1

INVENTOR.
ALEXANDER M. UNWIN
JOHN H. LEE
BY
ATTORNEY

INVENTORS
ALEXANDER M. UNWIN
JOHN H. LEE
BY
[signature]
ATTORNEY

ELECTROLUMINESCENT COLOR IMAGE APPARATUS

Filed Jan. 13, 1966 3 Sheets-Sheet 3

INVENTORS.
ALEXANDER M. UNWIN
JOHN H. LEE
BY
N. H. Thomas
ATTORNEY

3,511,925
ELECTROLUMINESCENT COLOR IMAGE APPARATUS

John H. Lee and Alexander M. Unwin, Bellevue, Wash., assignors to The Boeing Company, Seattle, Wash., a corporation of Delaware Filed Jan. 13, 1966, Ser. No. 520,412
Int. Cl. H04n 9/12
U.S. Cl. 178—5.4 3 Claims

ABSTRACT OF THE DISCLOSURE

A color television imaging system wherein three primary color light guns selectively scan a target of photoconductive elements each of which are serially coupled to a primary color light emitting diode and an electrical power source. Selective energization of the photoconductive elements by the light guns places them in a conducting state, switching electrical power from the power source to activate the diodes and generate a composite color image.

Figure 1:
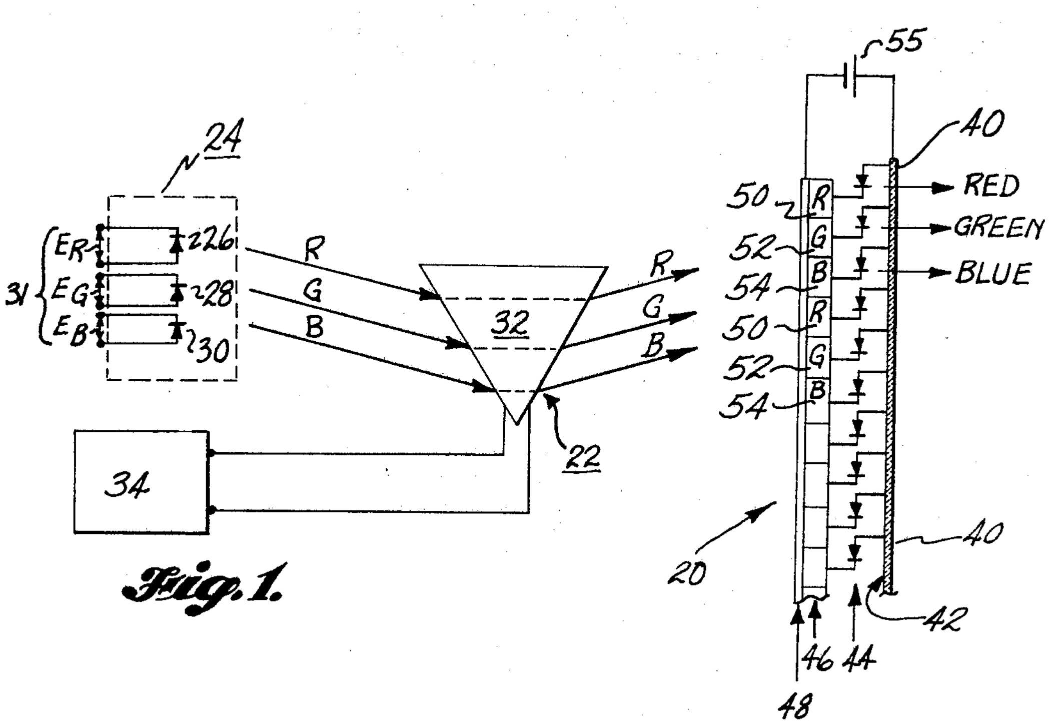

Alternatively, primary color light emitting diode junctions formed by intersecting $x$ and $y$ strips of semiconductor material are selectively activated to produce a composite color image by cooperatively scanning two sets of photoconductive elements connected to the $x$ and $y$ strips respectively, and to an electrical power source, with two light beams one of which contains video modulation.

This invention relates to apparatus for reproducing "radiant energy" images and providing color displays and in particular to apparatus for converting incoming electrical signals into visible images by means of a combination of electroluminescent and photosensitive devices.

Conventional large-screen TV or projected color-image display devices, such as a color television picture tube, require in part: (a) elaborate shadow masks near the viewing screen containing many very fine and accurately placed openings, (b) a very accurately deposited pattern of phosphor dot triads, (c) three electron guns, and (d) an evacuated enclosure. Such tubes are expensive to build, are difficult to adjust periodically for color fidelity, and the shadow mask reduces the picture brightness by intercepting a large percentage of the electrons in the three beams from the electron guns.

Prior attempts have been made to overcome some of the above-described problems. For example, the chromatron color tube was developed. However, the screen pattern still had to be accurately deposited even though the shadow mask and two of the electron guns were eliminated. A wire grid structure accurately aligned with respect to the screen pattern was used. However, the grid introduced a line structure in the picture, and the alternating voltage applied to the grids caused a radiative interference within the receiver.

The instant invention provides many advantages in comparison with the prior art devices, such as: (a) elimination of shadow masks; (b) provision of a simpler and more economical manufacturing system in the deposition of the screen pattern; (c) elimination of the requirement for a vacuum enclosure; (d) insensitivity to electromagnetic interference; and (e) provision of a simple and individual color tuning system.

The instant invention provides further sophistication over the prior art by replacing the electron gun with a light emitting diode. The scanning of the electron beam across the screen face as conventionally accomplished by the action of plates having a potential difference in order to control and direct the electron beam is entirely replaced by a "KDP" prism otherwise known as a potassium dihydrogen phosphate prism or similar device having the capability of directing light rays in a scan type fashion when a scan signal is applied to the prism. Instead of a phosphorous screen and a screen mask, the instant invention could be used with merely a ground glass screen, or in a more sophisticated image intensifier version. The invention provides a screen which contains a sandwich of two outer members being transparent conductors between which are a number of parallel circuits, each containing a photoconductor and light-emitting diode. The photoconductor and light-emitting diode are connected in series. In general, the present invention provides an entirely new concept in the field of electroluminescent color image reproduction based on recently developed techniques in the laser and prism (KDP) technical disciplines.

A feature of the invention is to provide a light analog of the cathode ray tube. A light gun replaces the conventional electron gun to produce a beam of photons. A means for deflecting this beam across a viewing screen to provide horizontal sweep is provided. The viewing screen is composed of a fine mosaic of light amplifying elements in parallel in place of the conventional passive phosphor coating.

A second feature of the instant invention provides a crossed-grid, flat, color-video display panel. The novel feature is the production of a light spot at a variable location in a large, flat semiconductor p-n junction. Each junction corresponds to one of a discrete number of X, Y coordinate points, and is excited to produce light by impressing a signal across the correspondingly labelled electrode pair. A scan signal for producing a raster is provided as are means to provide intensity modulation and colored displays.

It is, accordingly, an object of the instant invention to provide an electroluminescent color image apparatus wherein three light-emitting diodes are activated by a signal for producing, in each diode, a certain color light beam, which is scanned through a prism over a screen containing photoconductors and light-emitting diodes.

It is another object of this invention to provide an electroluminescent color image apparatus wherein the color tuning can be accurately accomplished by simple tuning means for each individual color.

Figure 2:
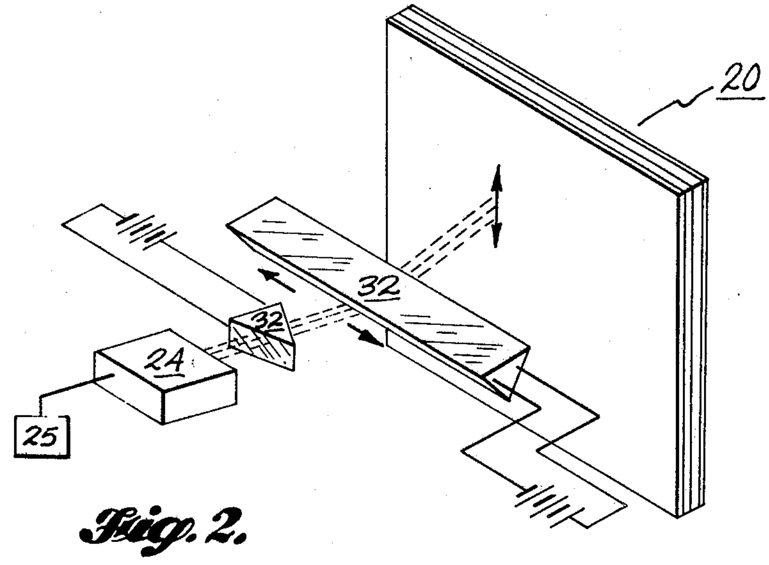

A third object of this invention is to provide a color image apparatus wherein the color image is reproduced in three sequentially different color scans. One light-emitting diode properly biased for an individual color and complete scanning of the image and thereafter the second and respectively the third color, providing the complete colored image by a triple scan method on the photoconductor pattern considered characteristic of this invention are set forth with particularity in the appended claims. The invention itself, however, both as to its organization and method of operation, as well as additional objects and advantages thereof, will best be understood from the following description when read in connection with the accompanying drawings in which:

FIG. 1 and FIG. 2 illustrate schematically and isometrically, respectively, one embodiment of the instant invention for reproducing an electrical signal into a color image. In FIG. 1, three light-emitting diodes are disposed to transmit three separate optical wavelengths to a prism system for projection to a screen by a scanning action of the prism system. In FIG. 2, a set of two prisms are shown to provide bi-directional scanning in the horizontal and vertical. A screen, detailed in FIG. 1, is provided with a plurality of photoconductor strips consisting of trios of adjacent areas sensitive to these same three optical wavelengths emitted by the diodes. Disposed in series with each trio area of the photoconductor strips are trios of light-emitting diode regions which emit red, green and blue light, respectively.

Figure 3:
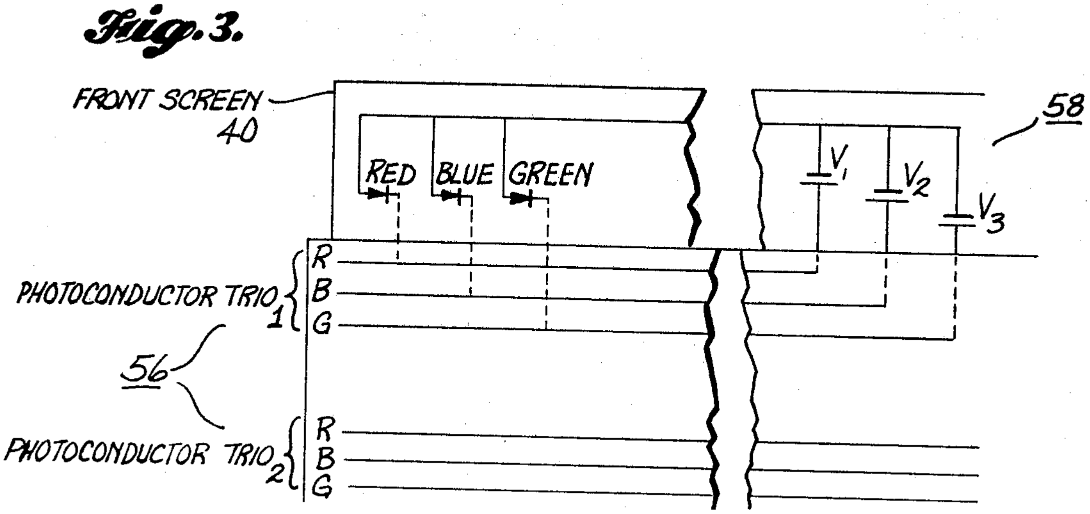

FIG. 3 is a second extension of the scheme shown in FIGS. 1 and 2. In this extension the photoconductor pattern is changed so as to contain trios of photoconductor lines so that the members of each trio are sensitive only to the wavelength from the voltage-tunable light gun when it is biased by the appropriate voltage. The embodiment shown in FIG. 3 makes use of the light gun property that output wavelength can be controlled by the applied voltage.

Figure 4:
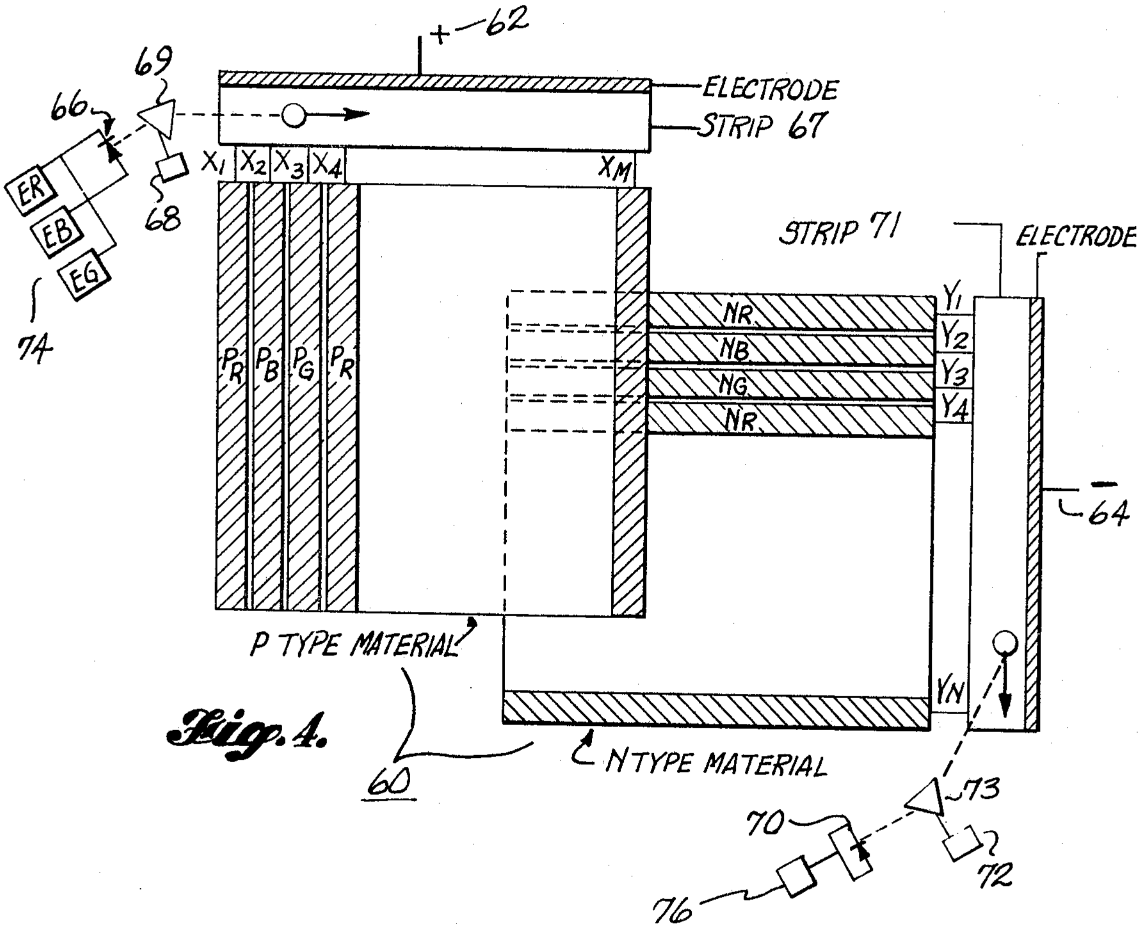

FIG. 4 is a third extension of the embodiment shown in FIG. 1 permitting the construction of a flat color picture tube. In this embodiment the light gun is completely eliminated. In its place light is produced at the grid position by the forward bias across a p-n sandwich junction. Each p-n sandwich junction emits a characteristic red, blue or green spot of light depending on the particular junction.

Figures 5, 5A, 5B:
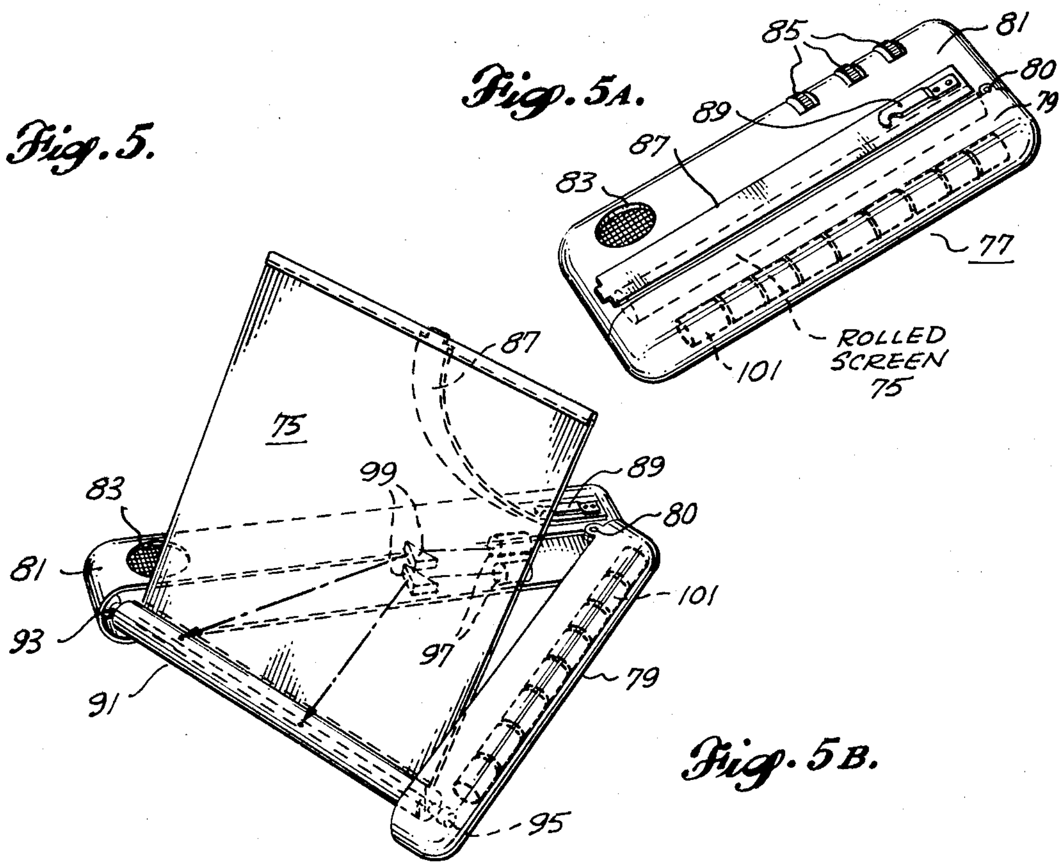

FIG. 5, views A through C, represents in isometric views the utilization of the FIG. 4 second extension of the scheme represented in FIGS. 1 and 2.

Referring now to FIG. 1, there is shown a color image reproducer comprising an image screen 20, a scanning unit 22, and a luminous control source 24. The luminous source 24 comprises a plurality of light-emitting diodes such as 26, 28 and 30. A signal source 31 is provided to modulate the beam intensity of the light-emitting diodes 26, 28 and 30. This signal source 31 may be a conventional color television signal receiver or signal generator adapted to provide signal information representing the individual primary color information of a televised object. These signals $E_R$, $E_G$ and $E_B$ which represent the color signals of red, green and blue, respectively, activate the diodes 26, 28 and 30, respectively. These diodes serve a light gun function analogous to the electron gun in a cathode ray tube or flying spot scanner of conventional systems. Each diode is used to energize selected areas of image screen 20 according to the color information supplied to the particular diode. The arrangement of FIG. 1 shows a three-color system employing three diodes, although it is to be understood that the number of diodes depends on the signal transmission color system.

Means for scanning the screen 20 is provided by light beam deflection means 32 (a pair of prisms 32 shown in FIG. 2 of suitable material such as potassium dihydrogen phosphate). A scanning signal from a source 34 provides the required scanning synchronization with the diode outputs.

The image screen 20 comprises a base or support member 40 which is preferably formed of a material transparent to visible light, such as glass or a flexible transparent plastic. One side of this member 40 is covered with a similarly transparent conductive coating 42. A light-emitting diode or junction electroluminescence layer 44 in film form is disposed adjacent to coating 42. Photoconductive member 46 in trios of materials sensitive to the radiation emitting from diodes 26, 28 and 30, respectively, is positioned contiguous to member 44. A final conductive layer or coating 48 covers the open side of member 46.

The conductive coatings or layers 42 and 48 may comprise films of material which is appropriately transparent. If screen 20 is viewed from the side opposite to that upon which the image is projected, viz., from side member 40, coating 42 deposited on glass member 40 must be transparent to visible light. The coating 42 may include tin oxide deposited on the glass by iridizing or may comprise other coatings generally known in the art. The conductive coating 48 of the screen 20, viewed as above, is made of a material which is transparent to the radiation emitted by diodes 26, 28 and 30 since it appears between the diodes and the photoconductive member 46.

The photoconductive member 46, sensitive to radiation emitted by diodes 26, 28 and 30, varies in conductivity in response to that radiation and thereby activates the light emitting diode layer 44 disposed in series with member 46 thereby keeping layer 44 activated until the supply voltage from source 55 is interrupted. However, if necessary a light barrier (not shown) may be interposed between the photoconductive layer 46 and the light-emitting diode layer 44 to prevent feedback of light from the layer 44 to the photoconductive layer 46. Photoconductive layer 46 is made up in strips containing repeated trios of the sequence 50, 52 and 54, each of which are horizontally disposed in the position shown and extending the width of the screen 20. Adjacent strips are staggered to avoid forming vertical strips of any single color. The photoconductive layer 46 is generally made of a material which increases its conductivity when subjected to optical energy from the diodes 26, 28 and 30. More specifically, each sensitive area of the photoconductive strips 50, 52 and 54 changes its conductivity only when subjected to optical energy at a particular frequency. Thus, the members of each trio 50, 52 and 54 are made sensitive to the specific radiation emitted by diodes 26, 28 and 30, respectively, and conduct energy to their associated diode, 44, thereby energizing each only when scanned by the appropriate light gu diode 26, 28, and 30, respectively. For the embodiment of FIG. 1 to function, each photoconductor element 50, 52 and 54 (labelled R, G and B, respectively) must respond only to rays from diode elements 26, 28 and 30 (activated by signals $E_R$, $E_G$ and $E_B$, respectively) and by none other; i.e., photoconductor 50 responds to rays from diode 26, photoconductor 52 to diode 28, etc.

In operation, the light-emitting diodes 26, 28 and 30, are driven by the signals labelled $E_R$, $E_G$ and $E_B$ and may emit in any three distinct "color" or wavelength regions. Thus, voltage from $E_R$ switches the first photoconductor "on" and may activate the series connected light diode 26 to emit red light, for example. The voltage source 55 which activates the diodes 50, 52 and 54 is periodically switched off to extinguish the image which would otherwise persist. Brightness of the emitted colors red, green and blue can be controlled separately by having separate supply voltages from a source 55 for each color. Color fidelity can be adjusted for each color separately by varying the strength of these separate voltage sources 55 by making use of the known voltage dependence of the output wavelength of certain light-emitting diodes (see, for example, "Electron-Hole and Electron-Impurity Band Tunnelling in Gallium Arsenide Luminescent Junctions," Physical Review Letters, pp. 483–485, June 1, 1963). By the use of these separate voltage supplies, as shown in FIG. 1, it is possible to make red more orange, green more yellow, and so forth.

Referring to FIG. 3, an extension of the above embodiment represented by FIGS. 1 and 2 makes it possible to reduce the number of light guns from three (26, 28 and 30 as shown in FIG. 1) to a single light gun (not shown), and to replace the trios of sensitive areas on each photoconductor strip 46 of FIG. 1, by trios of strips. In this extension the photoconductor pattern 46 as shown in FIG. 1 is changed to that shown in FIG. 3 and given the reference symbol 56. The photoconductor pattern 56 contains trios of photoconductor strips $(RBG)_1$, $(RBG)_2$, etc., where the members of each trio are sensitive only to the light from the light gun (not shown) when the light gun is biased by $V_R$, $V_B$ and $V_G$ (not shown), respectively. This makes use of the light gun property that output wavelength can be controlled by the applied voltage. (See Physical Review Letters, pp. 483–485, supra.)

Signals $V_R$, $V_B$ and $V_G$ (not shown) are applied sequentially during the triple scan of each of the photoconductor 56 patterns. First $V_R$ is applied during a scan of all the R strips, by two scanning prisms (not shown) similar to those shown in FIG. 2, and during this time it is modulated by signal $E_R$ (not shown) previously referred to in FIGS. 1 and 2. Then $V_B$, modulated by $E_B$ (not shown), is applied during a scan of all the B lines. Similarly, $V_G$, modulated by $E_G$ (not shown), is applied while all G lines are scanned. Thus, the three patterns in each photoconductor trio 56 are interlaced as desired to produce a color image across screen 40. Adequate persistence of signals is obtained by allowing the biases 58 ($V_1$, $V_2$ and $V_3$) which are connected across the photoconductor light-emitter diode branches (not shown) to be uninterrupted for a sufficiently long period.

Referring to FIG. 4, a second extension of the scheme represented in FIGS. 1 and 2 permits the construction of a "flat" color (or black and white) picture tube. This flat picture tube may have a plastic substrate which is flexible enough to be rolled for portability and/or installed on curved surfaces. FIG. 4 presents a schematic representation for accomplishing this; i.e., the multiple p-n junctions 60 have been separated from their normally joined positions and are shown in an exploded view in FIG. 4. In the embodiment of FIG. 4 the light guns 26, 28 and 30 of FIGS. 1 and 2 are completely eliminated. In their place light is produced at a particular grid position $x_m$, $y_n$ by a forward bias or potential from circuit bias terminals 62 and 64. The location $x_m y_n$ in the many possible sandwich junctions 60 is determined by the position of the light spots on the photoconductive strips 67 and 71. Each p-n junction 60 emits a characteristic red, blue or green spot of light depending on whether the particular biased junction of the p-n junctions 60 is $p_R$-$n_R$, $p_B$-$n_B$, or $p_G$-$n_G$ junction. No other junctions are allowed to be formed. The front face of the p-n sandwich structure 60 (n or p type material) is made partially transmitting of light.

Scanning of the p-n junctions 60 light emission is provided by switching a positive voltage from a source 62 in the sequence $x_1, x_2, x_3 \ldots x_m$ and stepping a negative voltage from a source 64 in the sequence $y_1, y_2, y_3 \ldots y_n$, each negative switching step occurring at the end of a positive sequence.

To produce the switching to establish video signal scanning, the light spots produced from diodes 66 and 70 are moved along the photoconductive strips 67 and 71, respectively, by application of scanning signals 68 and 72, respectively, to a scanner 69 and 73, similar to the light beam deflection means or scanner 32 shown in FIGS. 1 and 2. The beam intensity of light-emitting diode 66 is modulated by video signals from signal source 74 ($E_R$, $E_B$ and $E_G$), e.g., a conventional color television signal receiver or signal generator as seen in FIG. 1 reference numeral 31, and can be used for color tuning and the voltage from source 76 applied to diode 70 is unmodulated but can be used for brightness control. Light images in natural color or black and white may accordingly be produced by sequentially controlling the bias in various segments of the p-n junctions 60. By utilizing a scan signal 68 and 72 it is possible to switch or control the impedance of elemental regions of the photoconductors 67 and 71 placed in close association with the p and n portions of the electroluminescent p-n junctions 60. The beam from diode 66 is modulated with signals from sources 74, and made representative of the component colors of a televised image and may be developed and controlled through synchronized scanning by scanning signals from a source 68 applied to prism 69 and signals from a source 72 applied to prism 73, thus irradiating only those portions of photoconductors 67 and 71 associated with the p-n junction of junctions 60 capable of producing a given color. The beam from diode 70 merely provides the vertical scan; that from diode 66 provides the modulation as well as the horizontal scan. As the photo conductors 67 and 71 are selectively scanned by prisms 69 and 73, impedance of elemental areas of the photoconductors 67 and 71 is lowered permitting current from bias means 62 and 64 to flow to a particular p-n junction of the junctions 60 and thereby cause emission of light. Thus the scanning step effectively provides switching the junctions 60.

Thus, in operation, the embodiment of FIG. 4 produces color images in typical sequences as follows: (I) for the color red: scanning provides the switching means defined above and during the application of $E_R$ to diode 66 from modulator 74, the negative voltage through source 64 is stepped in the sequence $Y_1$ followed by positive voltage from source 62 in the sequence $x_1, x_4, x_7, x_{10} \ldots x_m$, then the negative voltage from source 64 is stepped to produce $y_4$, followed by positive voltage from source 62 in the sequence $x_1, x_4$, etc. The red color sequence would be interlaced with: (II) for the color blue: during the application of $E_B$ to diode 66 from modulator 74, the negative voltage through source 64 is stepped in the sequence $y_2$, followed by positive voltage from source 62 in the sequence $x_2, x_5, x_8, x_{11} \ldots x_{m+1}$, then the negative voltage from source 64 is stepped to produce $y_5$, followed by positive voltage from source 62 in the sequence $x_2, x_5, x_8$, etc. The red and blue color sequences would be interlaced with: (III) for green: during the application of $E_G$ to diode 66 from modulator 74, the negative voltage through source 64 is stepped in the sequence $y_3$, followed by positive voltage from source 62 in the sequence $x_3, x_6, x_9, x_{12} \ldots x_{m+2}$, then the negative voltage from source 64 is stepped to produce $y_6$ followed by positive voltage from source 62 in the sequence $x_3, x_6, x_9$, etc.

FIG. 5, views A through C, represents in isometric views the utilization of the FIG. 4 second extension of the scheme represented in FIGS. 1 and 2. FIG. 5 illustrates the use of a flexible screen 75, which embodies the many p-n sandwich junctions 60 (not shown) of FIG. 4, in a vest pocket or portable television unit.

Referring to FIG. 5A, the television unit is shown in its closed or inactive position. Casing means 77, having a first portion 79 pivotally connected by pin 80 to a second portion 81, contains in part a speaker 83, switching and actuator controls 85, rolled screen 75 and a tension spring 87 fastened to casing 77 by fastener 89.

Figure 5C:
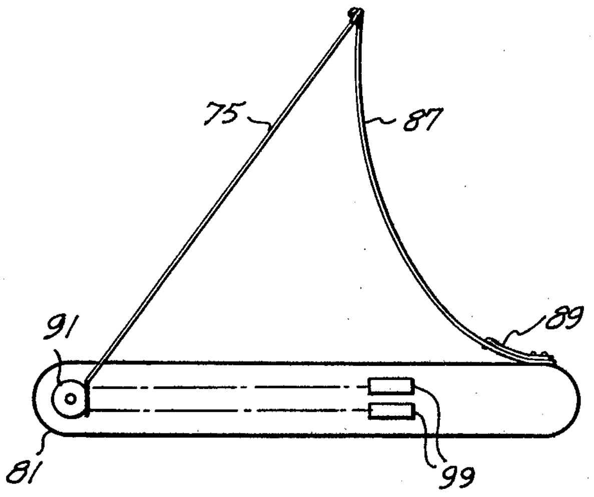

In FIGS. 5B and 5C the television unit is shown in its open or active position. Flexible screen 75, disposed to roll about roller 91, is shown in its extended position and supported by tension spring 87. The roller 91 contains in part the photoconductor strips (not shown) set forth in FIG. 4 as strips 67 and 71. The roller 91 is pivotally connected to second portion 81 of casing 77 by a pin 93. As the first portion 79 and second portion 81 are biased apart from the closed position of FIG. 5A to the open position of FIGS. 5B and 5C, roller 91 pivots about pin 93 while sliding on index pin 95 on means (not shown) in first portion 79. Diodes 97 and prism system 99 are disposed within second portion 81 of casing 77 and are activated to switch and scan the photoconductor strips (not shown) within roller 91 by a portable power source 101 within first portion 79 as discussed above with reference to FIG. 4. More particularly, the power source 101 functions: to provide a bias potential across the p-n junctions of screen 75 (bias 62 and 64 of FIG. 4); to provide voltage for brightness control (as, e.g., source 76 in FIG. 4); and to provide scan signals to the prism system 99 (as, e.g., signals 68 and 72 in FIG. 4).

Since numerous changes may be made in the above apparatus and different embodiments may be made without departing from the spirit thereof, it is intended that all matter contained in the foregoing description or shown in the accompanying drawings shall be interpreted as illustrative and not in a limiting sense.

We claim:

1. In combination with an electro-optical imaging apparatus having means for generating a video modulated electromagnetic beam and means for deflecting said beam in synchronism with the video modulation to selectively energize a visual display screen, an improved visual display screen comprising:

(a) an array of photoconductive switching elements for selective energization by the video modulated beam, each of said photoconductive elements having an electrically nonconducting state before energization and a proportional electrically conducting state initiated by energization by the video modulated beam;

(b) an array of light emitting elements for generating a visual image when selectively supplied with electrical power, each of said light emitting elements being electrically connected to a corresponding one of said photoconductive elements; and (c) means for coupling electrical power across said photoconductive elements and said light emitting elements, whereby said photoconductive elements switch electrical power to said light emitting elements to generate a visual image when selectively energized by said video modulated beam.

2. In combination with an electro-optical imaging system having means for generating a video modulated electromagnetic beam, an improved visual display apparatus comprising:

(a) an array of light emitting semiconductor elements including:
   (i) a plurality of first elongated strips of semiconductor material of a first conductivity type oriented in a first coordinate direction;
   (ii) a plurality of second elongated strips of semiconductor material of a second conductivity type overlaying said first elongated strips and oriented in a second coordinate direction; and
   (iii) a plurality of light emitting diode junctions formed at intersections of said first and second elongated strips;

(b) first photoconductive means having a plurality of elemental regions electrically connected to corresponding first elongated strips;

(c) second photoconductive means having a plurality of elemental regions electrically connected to corresponding second elongated strips;

(d) means for coupling electrical power across said first and said second photoconductive means;

(e) means for producing a first video modulated electromagnetic beam;

(f) means for producing a second electromagnetic beam;

(g) first deflection means for deflecting said first video modulated electromagnetic beam to illuminate successive elemental regions of first photoconductive means in synchronism with the video modulation; and (h) second deflection means cooperating with said first deflection means for deflecting said second electromagnetic beam to illuminate successive elemental regions of said second photoconductive means in synchronism with the video modulation; whereby the elemental regions of said first and second photoconductive means cooperatively switch electrical power to said light emitting diode junctions to generate a visual image when selectively illuminated by said first video modulated electromagnetic beam and said second electromagnetic beam.

3. In combination with a color light-image reproducing apparatus of the type having means for generating first, second, and third intensity modulated light beams, and means for bidirectionally scanning each of the light beams in synchronization so as to scan a raster, an improved light-sensitive color-image producing target comprising:

(a) a first layer of photoconductive material having first, second, and third photoconductor elements which vary in electrical conductivity when illuminated by the first, second, and third light beams, respectively;

(b) a second layer of electroluminescent material; and (c) means for coupling an electrical potential across said first and second layers in series relation.

References Cited

UNITED STATES PATENTS

| | | | |
|---|---|---|---|
| 2,836,652 | 5/1958 | Sprague | 178—7.6 |
| 3,290,554 | 12/1966 | Sack. | |
| 3,315,176 | 4/1967 | Biard. | |
| 3,341,857 | 9/1967 | Kabell. | |

ROBERT L. GRIFFIN, Primary Examiner

A. H. EDDLEMAN, Assistant Examiner

U.S. Cl. X.R.

178—7.3